(12) United States Patent
Guenter et al.

(10) Patent No.: US 10,012,832 B2
(45) Date of Patent: Jul. 3, 2018

(54) AUTOMATIC LENS DESIGN USING OFF-THE-SHELF COMPONENTS

(71) Applicant: Microsoft Technology Licensing, LLC, Redmond, WA (US)

(72) Inventors: Brian K. Guenter, Redmond, WA (US); Neel S. Joshi, Seattle, WA (US); Libin Sun, Brookline, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 442 days.

(21) Appl. No.: 14/746,468

(22) Filed: Jun. 22, 2015

(65) Prior Publication Data

US 2016/0370578 A1    Dec. 22, 2016

(51) Int. Cl.
*G06F 17/50* (2006.01)
*G02B 27/00* (2006.01)
*G02B 15/14* (2006.01)

(52) U.S. Cl.
CPC .......... *G02B 27/0012* (2013.01); *G02B 15/14* (2013.01)

(58) Field of Classification Search
CPC ............................ G02B 27/0012; G02B 15/14
USPC ............................................................ 703/1
See application file for complete search history.

(56) References Cited

U.S. PATENT DOCUMENTS

| 2,428,399 A | 10/1947 | Timoney | |
|---|---|---|---|
| 6,199,983 B1 | 3/2001 | Kato et al. | |
| 6,318,859 B1 * | 11/2001 | Baudart | G02C 7/025 |
| | | | 351/159.42 |
| 7,111,938 B2 | 9/2006 | Andino et al. | |
| 8,075,132 B2 | 12/2011 | Blum et al. | |
| 8,390,675 B1 | 3/2013 | Riederer | |
| 2005/0073648 A1 * | 4/2005 | Toshima | A61B 3/10 |
| | | | 351/200 |
| 2006/0056050 A1 * | 3/2006 | Caldwell | G02B 15/177 |
| | | | 359/686 |
| 2007/0041102 A1 * | 2/2007 | Kuo | G02B 15/161 |
| | | | 359/680 |
| 2008/0174678 A1 * | 7/2008 | Solomon | G02B 27/0025 |
| | | | 348/231.99 |

(Continued)

FOREIGN PATENT DOCUMENTS

CN           201096306 Y    8/2008
EP             2681507 A2    1/2014

OTHER PUBLICATIONS

ZEMAX, "ZEMAX Optical Design Manual, User's Manual" Jul. 8, 2011, Radiant ZEMAX LLC, 805 pages.*

(Continued)

*Primary Examiner* — Dwin M Craig
(74) *Attorney, Agent, or Firm* — Schwegman Lundberg & Woessner, P.A.

(57) ABSTRACT

A system that comprises a receiver port to receive lens system design specifications; and a processor to: select a lens system type that includes one or more preliminary lenses, the selecting based, at least in part, on the lens system design specifications; from a lens database, select one or more catalog lenses to add to or replace the one or more preliminary lenses of the lens system type to construct a lens system; vary distances between or among the one or more catalog lenses and/or the one or more preliminary lenses of the lens system; and as the distances vary, determine optical behavior of the lens system.

18 Claims, 6 Drawing Sheets

(56) References Cited

U.S. PATENT DOCUMENTS

| | | | |
|---|---|---|---|
| 2008/0195003 A1* | 8/2008 | Sliwa | A61N 7/02 |
| | | | 601/3 |
| 2009/0213094 A1* | 8/2009 | Bridger | G06F 3/0421 |
| | | | 345/175 |
| 2013/0003184 A1 | 1/2013 | Duparre | |
| 2013/0141909 A1* | 6/2013 | Ashdown | G02B 19/0066 |
| | | | 362/240 |
| 2015/0055086 A1 | 2/2015 | Fonte et al. | |

OTHER PUBLICATIONS

Edmund Optics, "Abberational Balancing of MTF in Lens Design", published on Apr. 18, 2014, available at <<http://www.edmundoptics.com/technical-resources-center/imaging/aberrational-balancing-of-mtf-in-lens-design/>>, 3 pages.

Govier, "Designing Optical Systems with Off-The-Shelf Products", published on Jan. 1, 2012, available at <<http://www.techbriefs.com/component/content/article/23-ntb/features/feature-articles/12684>>, 2 pages.

Mattison Shupnick, "It's Getting Personal: Your Lab and the Opportunity for Personalized Lenses", published on Feb. 2010, available at <<http://www.2020mag.com/ce/TTViewTest.aspx?LessonId=107701>>, 6 pages.

Resolveoptics, "Custom Lenses for Demanding Machine Vision Applications", published on Aug. 27, 2014, available at <<http://www.resolveoptics.com/news/news-98.html>>, 1 page.

Special Optics, "Custom Optical Solutions", a Naviator Company, retrieved on Apr. 15, 2014, available at <<http://www.navitar.com/pdf/Special%20Optics%20Capabilities.pdf>>, 10 pages.

* cited by examiner

AUTOMATIC LENS DESIGN USING OFF-THE-SHELF COMPONENTS

BACKGROUND

Lens systems are commonly used in many devices, such as cameras, telescopes, binoculars, office equipment, and scientific instruments, just to name a few examples. Lens systems may comprise lenses, aperture stops, and a lens housing to contain the lens and/or aperture stops in optical alignment with one another. Performance of lens systems depends, in part, on the design of each of the elements of the system as well as the overall design of the system, which sets forth the optical interaction among the elements.

SUMMARY

This disclosure describes techniques and architectures for automatically designing customized lens systems that use catalog lenses and other components. For example, during a design process, any of a number of stock or catalog lenses may be selected from a database for virtual placement in the lens system design. In a particular iterative design process, such lenses are selected and virtually placed in a preliminary lens system design, and air gaps, among other things, are varied while optical performance of the preliminary lens system design is determined. Lenses may be replaced or individual lenses may be split into two individual lenses in the preliminary lens system design. Air gaps and other parameters may again be varied while optical performance of the preliminary lens system design continues to be determined. A finalized lens system design may be achieved upon reaching a lens design configuration that satisfies particular optical quality parameters, such as focus quality, for example.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Designing and building a custom lens system has generally been in the domain of lens design experts. Custom lens designing remains challenging for most lens design experts and almost impossible for most end users. For example, if presented with an atypical imaging scenario, one must either use a sub-optimal catalog lens system or pay a relatively high cost (e.g., in money and time-to-development) for a custom lens system design. While the cost of digital imaging equipment has dropped considerably in the last decade, custom lenses are still prohibitively expensive. Lens design companies may not design and manufacture a single lens since their financial benefits come not from design fees but from the manufacture of thousands or millions of lenses. Typical manufacturing lead times for a custom lens system may be greater than three months. Between design and manufacturing expenses, a custom multi-element lens system may cost tens or hundreds of thousands of dollars. Accordingly, custom lens systems have been generally out of the reach of all but relatively large or well-funded companies and university labs, for example.

Various examples describe techniques and architectures for a computing process that, among other things, automatically designs custom optical lens systems using predetermined, existing lenses (e.g., stock lenses, off-the-shelf lenses, catalog lenses, or lenses having predefined characteristics). Herein, such lenses may be called "catalog lenses." Such lens systems may include multi-element lenses for use in cameras, projectors, or any optical collimating system. Such a computing process may provide a number of benefits such as reducing costly and time consuming lens design processes performed by persons having specialized expertise in lens design. Such a computing process may lead to a lens system design subsequent to receiving, from an operator, for example, a relatively simple specification for a lens system. The computing process may "optimize" a lens system design for a "best" multi-element lens system comprising relatively inexpensive catalog lenses. For example, optimizing a lens design system may involve solutions that meet predetermined characteristics that are determined after a certain number of iterations, and so on. Herein, "optimize" need not refer to a best solution or result, but may refer to a solution or result that "is good enough" for a particular application, for example. In some implementations, an objective is to design a "best" lens design, but there may be a variety of factors that may result in alternate designs yielding better results. For example, an optimization problem may search for a combination of factors that result in a minimum value for a lens system parameter (e.g., distortion, chromatic aberration, MTF, and so on). Such factors may include particular optical characteristics of lens system elements. The optimization problem may find local minima instead of a global minimum. Thus, some changes to the variety of factors may result in a jump from one local minimum to another local minimum. In either case, resulting lens system designs may be considered "good enough", substantially optimal", or "sufficiently good." Herein, the term "optimize" may refer to such results based on local minima (or maxima, depending on what parameters are considered in the optimization problem.

Due to a relatively wide range of possible values for a large number of discrete and continuous parameters, the number of possible combinatorial lens configurations for a particular lens system specification may be vast. Accordingly, a computing process for automatically designing a lens system may include a process that starts from a relatively simple existing design and incrementally adds lenses to improve optical performance. At iterative rounds of optimization, the computing process proposes and evaluates a relatively large number of lens systems in which new lenses are added according to lens adding or replacement (e.g., "splitting") rules. Air gaps (e.g., distances or spaces between adjacent lenses and/or aperture stops) may be adjusted during a continuous optimization process. In some implementations, a custom lens housing may be designed based, at least in part, on a final lens system design and fabricated using, for example, 3D printing. Design, ordering of parts, delivery, and assembly of a custom lens system may be completed in a few days, at a cost of a few hundred dollars, for example.

Lens systems designed using techniques and architectures described herein may be used in any of a large number of types of imaging devices, such as digital cameras and projectors. For some of these devices, such as single lens reflex (SLR) cameras, there may be hundreds of reasonably-priced, high quality interchangeable lens systems available. However, reasonably-priced lens systems generally address the most common imaging scenarios, such as portrait, landscape, and macro photography. Due to generally high costs of custom and manually designed lens systems, camera manufactures may find it difficult to create and stock lenses for all possible usage scenarios. Moreover, for many other types of devices (e.g., camera phones, point and shoot cameras, projectors, head-mounted displays, webcams, and so on), there are relatively few available lens systems. Techniques and architectures described herein may lead to custom lens systems that unlock new capabilities in a variety of fields such as computer graphics, computer vision, computational photography, medical imaging, surveillance, virtual reality, and gaming.

Generally, for a lens system, light output of one lens may be the light input of a subsequent lens or a light sensing device. A lens system may be designed, for example, to provide an image onto a light-sensitive device, such as a charge-coupled device (CCD), a photodiode, or a human eye(s).

Various examples are described further with reference to FIGS. 1-8.

The environment described below constitutes but one example and is not intended to limit the claims to any one particular operating environment. Other environments may be used without departing from the spirit and scope of the claimed subject matter.

Figure 1:
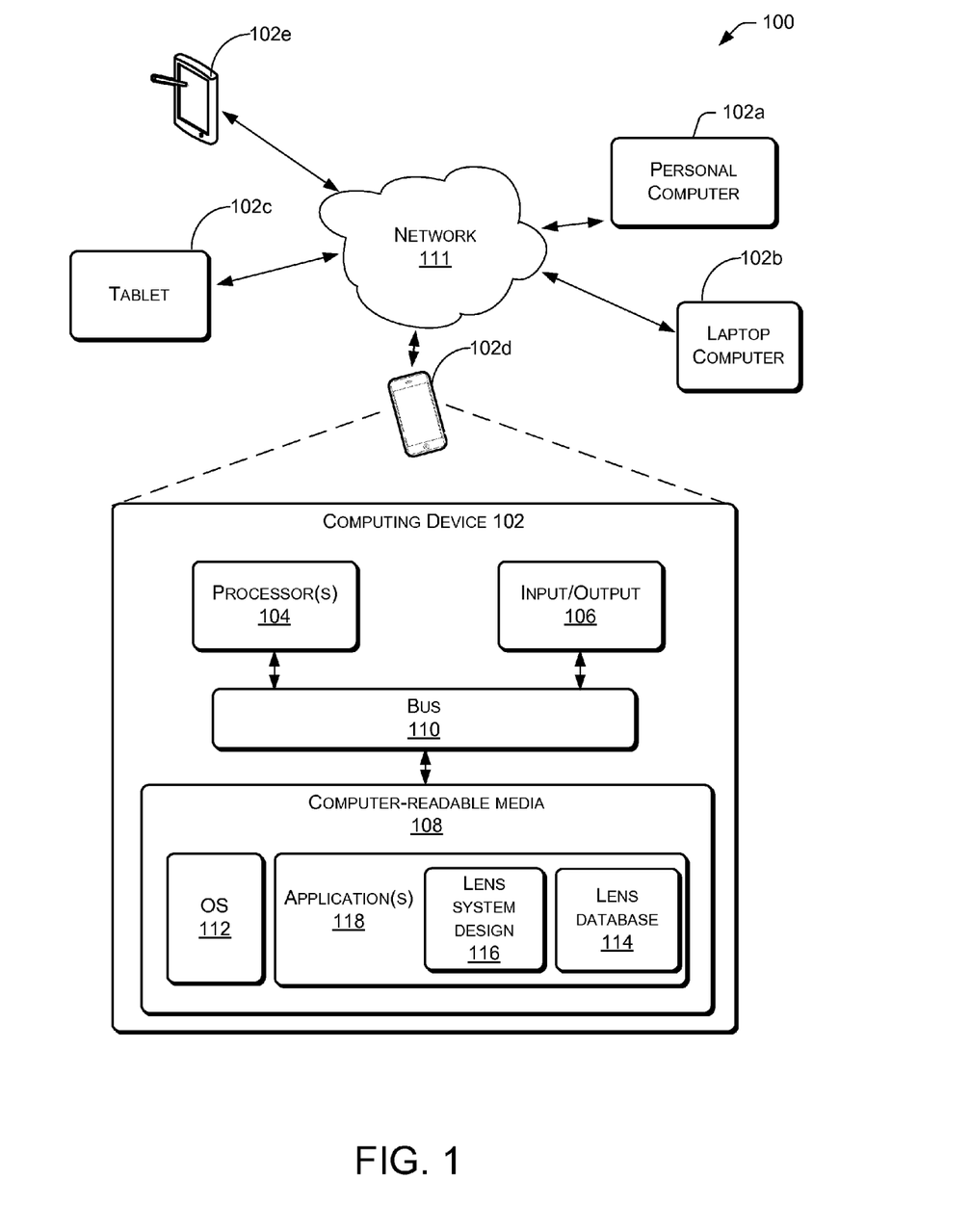
FIG. 1 is a block diagram depicting an example environment in which techniques described herein may be implemented.

FIG. 1 illustrates an example environment 100 in which example processes that involve designing lens systems as described herein can operate. In some examples, the various devices and/or components of environment 100 include a variety of computing devices 102. By way of example and not limitation, computing devices 102 may include devices 102a-102e. Although illustrated as a diverse variety of device types, computing devices 102 can be other device types and are not limited to the illustrated device types. Computing devices 102 can comprise any type of device with one or multiple processors 104 operably connected to an input/output interface 106 and computer-readable media 108, e.g., via a bus 110. Computing devices 102 can include personal computers such as, for example, desktop computers 102a, laptop computers 102b, tablet computers 102c, telecommunication devices 102d, personal digital assistants (PDAs) 102e, electronic book readers, wearable computers (e.g., smart watches, personal health tracking accessories, augmented reality and virtual reality devices, etc.), automotive computers, gaming devices, etc. Computing devices 102 can also include, for example, server computers, thin clients, terminals, and/or work stations. In some examples, computing devices 102 can include components for integration in a computing device, appliances, or other sorts of devices.

In some examples, some or all of the functionality described as being performed by computing devices 102 may be implemented by one or more remote peer computing devices, a remote server or servers, or distributed computing resources, e.g., via cloud computing. In some examples, a computing device 102 may comprise an input port to receive lens system design specifications. Computing device 102 may further comprise one or multiple processors 104 to access various sources of information related to or associated with catalog (e.g., pre-existing) lenses or other optical components. Such sources may include databases of lens specifications, Internet-based lens catalogs, and optical company websites, just to name a few examples. One or multiple processors 104 may be hardware processors or software processors. As used herein, a processing unit designates a hardware processor.

In some examples, as shown regarding device 102d, computer-readable media 108 can store instructions executable by the processor(s) 104 including an operating system (OS) 112, a lens database module 114, a lens system design module 116 and programs or applications 118 that are loadable and executable by processor(s) 104. The one or more processors 104 may include one or more central processing units (CPUs), graphics processing units (GPUs), video buffer processors, and so on. In some examples, lens database module 114 comprises executable code stored in computer-readable media 108 and is executable by processor(s) 104 to retrieve or collect lens information, locally or remotely by computing device 102, via input/output 106.

Lens system design module 116 may selectively apply any of a number of optical models, ray tracing, and optical optimization processes using executable code that may be stored in computer-readable media 108 to apply to lens data to design a lens system.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Computer readable media 108 includes computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, computer-readable media 108 is an example of computer storage media storing computer-executable instructions. When executed by processor(s) 104, the computer-executable instructions configure the processor(s) to, among other things, select a lens system type that includes one or more preliminary lenses, select one or more catalog lenses to add to or replace the one or more preliminary lenses of the lens system type to construct a lens system; vary distances between or among the one or more catalog lenses and/or the one or more preliminary lenses of the lens system; and as the distances vary, measure optical behavior of the lens system.

In various examples, an input device of or connected to input/output (I/O) interfaces 106 may be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 102 may also include one or more input/output (I/O) interfaces 106, which may comprise one or more communications interfaces to enable wired or wireless communications between computing device 102 and other networked computing devices involved in collecting specifications for catalog lenses, or other computing devices, over network 111. Such communications interfaces may include one or more transceiver devices, e.g., network interface controllers (NICs) such as Ethernet NICs or other types of transceiver devices, to send and receive communications over a network. Processor 104 (e.g., a processing unit) may exchange data through the respective communications interfaces. In some examples, a communications interface may be a PCIe transceiver, and network 111 may be a PCIe bus. In some examples, the communications interface may include, but is not limited to, a transceiver for cellular (3G, 4G, or other), WI-FI, Ultra-wideband (UWB), BLUETOOTH, or satellite transmissions. The communications interface may include a wired I/O interface, such as an Ethernet interface, a serial interface, a Universal Serial Bus (USB) interface, an INFINIBAND interface, or other wired interfaces. For simplicity, these and other components are omitted from the illustrated computing device 102. Input/output (I/O) interfaces 106 may allow a device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
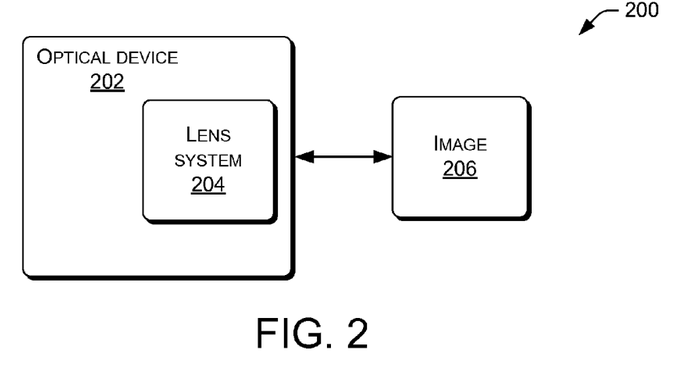
FIG. 2 is a block diagram illustrating an example optical system.

FIG. 2 is a block diagram illustrating an example optical system 200 that includes an optical device 202, which includes a lens system 204 configured to produce or receive an image 206. For example, optical device 202 may include an analog or digital camera, projector, laser pointing device (e.g., beam collimator), telescope, binoculars, and so on. Optical device 202, which need not be an electronic device, may include lens system 204 in any portion thereof. Lens system 204 may include two or more lenses (though lens system design processes described herein may be applied to designing single lenses), aperture stop(s), and a lens housing. In some implementations, a lens system may include an image sensor. Herein, a "lens" is an individual optical element that operates on light by either refraction or reflection. In the case of refraction, the light transmits through the lens. In the case of reflection, the light reflects from the lens surface (e.g., or surfaces or interfaces that may be present on a reflective optical element that includes surface coatings). A lens may comprise any of a number of types of materials, such as glass, quartz, plastic, natural minerals (e.g., sapphire), and so on.

Light discussed herein need not be limited to the visible portion of the spectrum. Instead, light can include electromagnetic radiation in any portion of the spectrum, including ultra-violet, visible, and infrared. For example, processes described herein may be used to design a lens system to operate in any portion of the electromagnetic spectrum.

Generally, the aperture of a lens system is the opening(s) that determines the cone angle of a bundle of rays that come to a focus in an image plane. The aperture determines how collimated the admitted rays are, which in turn determines the appearance at the image plane. Though an optical system typically has many "naturally occurring" structures, such as the edge of lenses or fixtures that hold optical elements in place, aperture stops may be placed in the optical system to particularly control the light admitted by the system.

Figure 3:
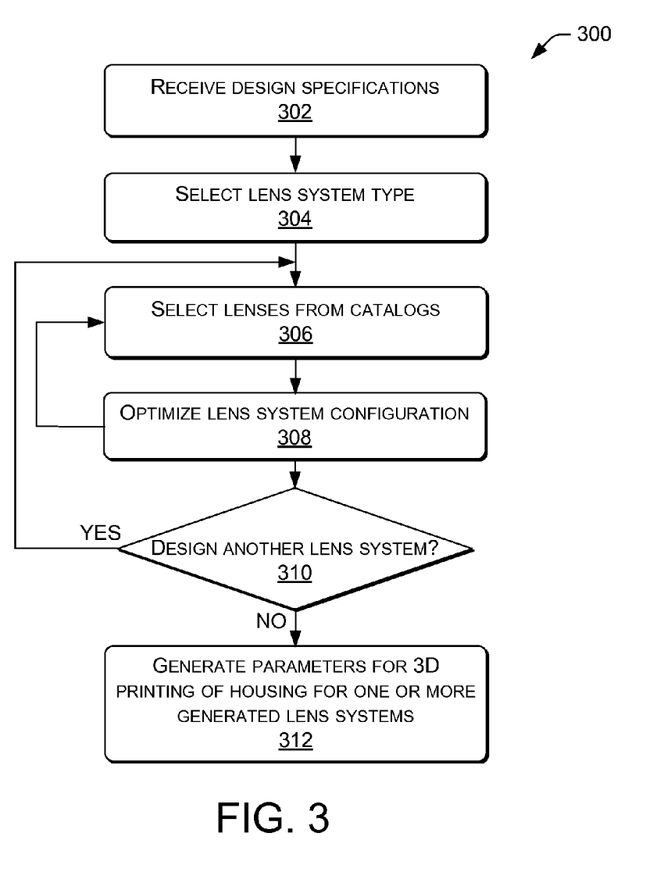
FIG. 3 is a flow diagram of an example process for automatically designing a lens system.

FIG. 3 is a flow diagram of an example process 300 for automatically designing a lens system. For example, process 300 may be performed by a processor(s), such as 104 illustrated in FIG. 1. At block 302, to initiate a lens system design, a processor may receive specifications for the lens system from a user. For example, the processor may prompt the user for various parameters in a number of steps (e.g., the user may enter such parameters in a questionnaire). Such parameters may include sensor format, sensor orientation, desired field of view, f-number, maximum number of allowed lenses in the lens system, maximum allowed cost, distance and orientation of the object plane relative to the optical axis, wavelength range, anti-reflection (AR) coating requirements, and physical size(s), just to name a few examples. Components with fixed positions may be specified as non-movable. For add-on lens system applications, the user may specify the planned location (and other details) of a corresponding lens system. For example, add-on lens system applications may include supplementing an existing lens system. In some applications, an add-on lens system may be used for altering magnification (e.g., a tele-extender or a doubler) of an existing lens system.

If a sensor of the lens system is to be parallel to the object plane, then during the subsequent lens system design process, emitter positions may be sampled uniformly along a radial line perpendicular to the optical axis of the lens system to cover a desired field of view (FOV). If, however, a sensor of the lens system is not to be parallel to the object plane, then the user may specify a grid of emitter points on the object plane.

At block 304, the processor may select a lens system type based, at least in part, on the specifications received in block 302. A lens system type may include any of a number of types of relatively broad and generic lens systems, such as the triplet lens system or the Double Gauss lens system. A lens system design process may begin with such a generic lens system type to avoid a need to perform a brute-force initial search over a relatively large number of lens candidates.

At block 306, the processor may replace lenses in the starting lens system type with catalog lenses from catalogs or databases. For example, a catalog lens may be the same type, but not necessarily the same focal length or diameter, as the lens being replaced. As described in detail below, the processor may perform lens replacement multiple times.

At block 308, in an iterative process that involves block 306, the processor may perform any of a number of types of optical optimization techniques to optimize the lens system design for a particular configuration of lenses. For example, optimization techniques may involve optimizing a lens design based, at least in part, on meeting predetermined performance characteristics or performing a certain number of iterations and selecting a best outcome, and so on. As part of a lens system design process, upon or after determining an optimal configuration (e.g., air gaps between and among lenses) for a particular combination of lenses, the processor may subsequently modify the combination of lenses by replacing one or more lenses with different lenses from catalogs (e.g., block 306). Herein, "determining" may be implemented in a variety of ways such as, for example, by a processor performing computations, by using a look up table, or a combination thereof. The processor may then determine an optimal configuration for this latest combination of lenses. The processor may terminate such an iterative process of selecting catalog lenses and optimizing their configuration subsequent to yielding a candidate lens system design that satisfies desired specifications (e.g., as received in block 302).

At diamond 310, the processor determines whether or not to design another lens system. If so, the processor returns to block 306 to the design process described above to design another lens system. For example, because of a relatively large number of available catalog lenses, and the resultingly large number of possible configurations (e.g., air gaps), the processor may design a relatively large number of candidate lens system designs that have optical performances that are similar to one another, but individually may have traits or trade-offs among any of a number of optical parameters. For example, a first candidate lens system design may have the lowest chromatic aberration in the central field, but a second lens system design may have a slightly better match to the overall specifications of the desired lens system. A user may manually select among a number of such candidate lens system designs.

After a desired number of candidate lens system designs have been generated, the processor may proceed to block 312, where the processor may generate parameters for 3D printing of lens housing(s) for one or more of the candidate lens system designs.

Figure 4:
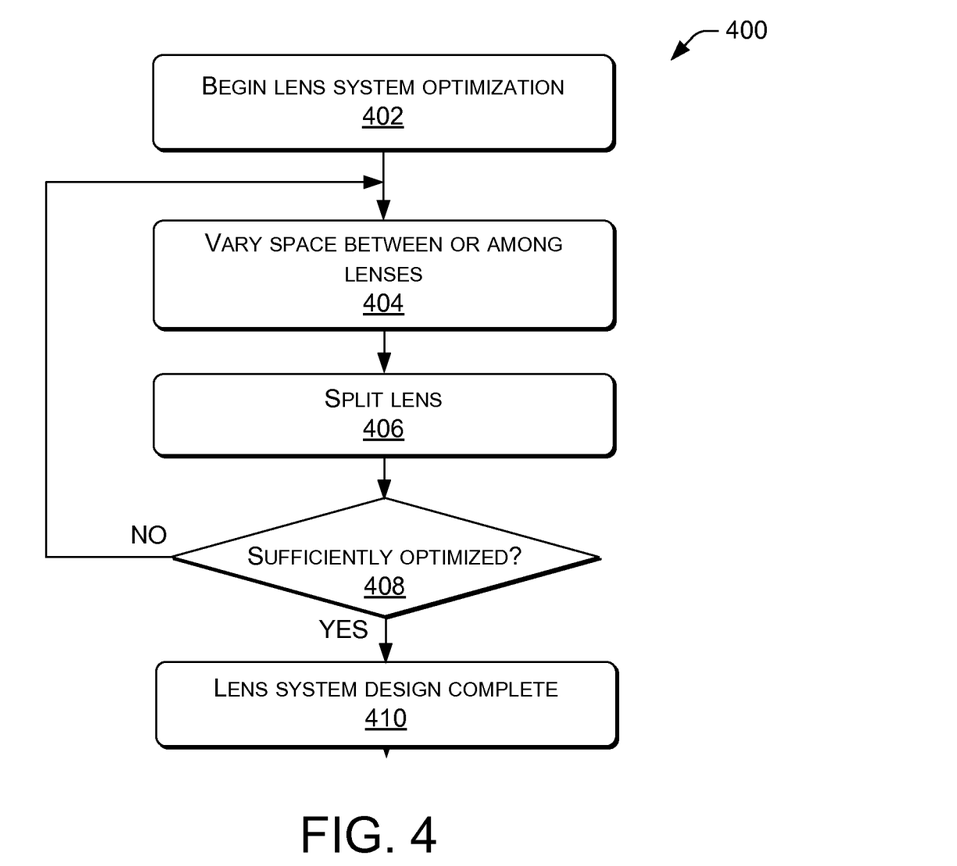
FIG. 4 is a flow diagram of an example process for automatically optimizing a configuration for a lens system.

FIG. 4 is a flow diagram of an example process 400 for automatically optimizing a configuration for a lens system design. "Configuration", among other things, refers to lenses of the lens system design and distances or spacings (e.g., air gaps) between or among the lenses. The location(s) and number of aperture stops may also be considered to be parameters of the configuration of a lens system design.

Process 400, which may be performed by a processor(s) such as 104 illustrated in FIG. 1, may be the same as or similar to blocks 306 and 308 of process 300, for example.

At block 402, a processor may initiate an optimization process for a configuration for a lens system design. For example, such a configuration may comprise a Cooke triplet lens system including particular lenses (e.g., each having particular focal lengths, diameters, and so on) that are respectively spaced apart by particular distances. An optimization process may involve adding lenses, replacing lens, adding aperture stops, changing relative positioning among the lenses and/or aperture stops, and so on. As described below, such an optimization process may be performed while measuring (e.g., calculating or determining) any of a number of optical performance parameters, such as a modulation transfer function (MTF) and optical path difference (OPD), just to name a few examples. Herein, "measuring" refers to calculations based, at least in part, on optical principles that are used to determine light (ray) behavior in a lens system. In other words, measuring here does not, unless specifically described otherwise, refer to physically measuring parameters of a lens system (e.g., such as in a laboratory setting).

In some embodiments, a processor may use objective functions in an optimization process that include spot size minimization, OPD, or maximizing the MTF response at desired frequencies. OPD optimization may not yield maximum MTF performance, but MTF optimization early in a lens system design process may fail to converge if the initial lens system design has poor optical performance. In some implementations, the processor may first optimize OPD and then switch to MTF optimization. In some particular examples, the processor may use through-focus MTF as an objective function to avoid convergence problems associated with early use of an MTF objective function and to use only one function rather than requiring a manual switch between OPD and MTF.

In some embodiments, an optimization process includes continuous optimization and discrete optimization. For example, a processor may use a continuous optimization process to determine distances between or among lenses of a lens system design. The processor may use a discrete optimization process to select lenses of a lens system design.

A processor may perform continuous optimization in two phases, described below. Ultimately, maximizing MTF is desired because relatively large values for MTF are generally strongly correlated with perceived image quality of a lens system. MTF optimization, however, may be prone to becoming trapped in local minima if MTF optimization is applied early in the optimization process when the lens performance is poor. Minimizing spot size, or OPD, may be less prone to becoming trapped in local minima. Minimized spot size, however, may not yield the best MTF response. Accordingly, the processor may use a hybrid system, which first minimizes spot size and then maximizes MTF, for example.

As part of performing the optimization process 400, the processor proceeds to block 404 to vary spaces (e.g., air gaps or distances) between or among lenses of the lens system design. The lens system configuration $\mathit{L}^k_{c,d}$ comprises a fixed sequence of k optical elements $c=[c_1, c_2, c_3, \ldots c_k]$ and the air spaces $d=[d_1, d_2, \ldots d_{k-1}]$ between adjacent elements. Here, "elements" refers to lenses and/or aperture stops. Each element $c_i$ may be either a lens or an aperture stop listed in a lens catalog or a database. The aperture size of the aperture stop may be fixed given an f-number and $\boldsymbol{l}^k_{c,d}$. The processor maintains air gaps to be non-negative to avoid interpenetration of lens elements.

Given a fixed lens system configuration $\boldsymbol{l}^k_{c,d}$ and a well-defined objective function $\mathcal{F}$ (e.g., which may be a convex objective function) that measures image sharpness of point light sources $\{e_i\}$, there exists a unique optimal back focal length (BFL) $d^*_k = \mathrm{argmin}\,\mathcal{F}(\boldsymbol{l}^k_{c,d})$, where $d_k$ is the air gap between a sensor and the last optical surface (e.g., nearest the sensor) in the lens system design. BFL may be used in a similar fashion, for example, by an auto-focus mechanism in digital cameras. In particular, the objective function may be given by tracing rays of three wavelengths ($\lambda j$) from each point light source position $e_i$ in the object plane of the lens system:

$$\mathcal{F}(\boldsymbol{l}^k_{c,d}, d_k) = (1/3n)\Sigma\Sigma f(e_i, \lambda_j, \boldsymbol{l}^k_{c,d}, d_k),\qquad\text{Equation 1}$$

where $f$ is a function measuring spot size or OPD via geometric ray tracing and n is the number of emitter positions. The right summation is over the index i, which indexes from 1 to n. The left summation is over the index j, which indexes from 1 to 3, corresponding to the three color channels RGB. $e_i$ is an ith emitter out of the set of n emitters. $\lambda j$ is a set or vector of three elements. For example, for each channel, the processor may shoot light rays of multiple wavelengths through the lens system design (from the set of values indicated by $\lambda j$. In a particular example, the processor may use three wavelengths per channel, so each $\lambda j$ is a set of 3 values. Of course, the description above is merely an example, and claimed subject matter is not limited to any particular number of frequencies. For spot size, the processor may compute the Mean Sum of Squared Error (MSSE) with respect to the centroid of a spot diagram for the lens system. For the OPD, the processor may compute the MSSE with respect to the mean optical path.

In some implementations, the processor need not minimize the spot size of the sum of the three wavelengths ($\lambda j$) (e.g., red, green, and blue channels). This allows the lens system to have small amounts of lateral chromatic aberration, which may be corrected relatively easily in a post process. Choice of objective function in Equation 1 reflects this design by summing costs independently over each color channel. Here, costs refer to scalar output given by the objective function. In some embodiments, a goal of an optimization process is to minimize cost, which may be interpreted as the "energy" of the lens system. In such a case, higher cost is undesirable and lower cost is desirable.

The sensor position of the lens system design may be initialized by tracing a single paraxial ray close to the optical axis of the lens system from a point light source at infinity. The processor may place the sensor at the intersection of this ray and the optical axis. The processor may then minimize $\mathcal{F}$ with respect to $d_k$ via a gradient descent. Derivative computation may be performed via Richardson extrapolation.

For optimizing lens air gaps in the lens system design, the processor's goal may be to optimize for d given a particular c. In other words, the processor may select a set of air gap values $d^* = \mathrm{argmin}\,\mathcal{F}(\boldsymbol{l}^k_{c,d})$, where $d^*_k$ is the optimal BFL recomputed as described above for any change in lens spacing. The processor may use gradient descent to optimize d while attempting to break out of any local minima using a local search. For example, such a local search may involve testing for relatively many values for the vector $d = [d_1, d_2, \ldots d_{k-1}]$ around a current value, in the k-dimensional space, to determine if there exists a nearby vector value that gives a lower cost according to the objective function. Searching may be bounded by an epsilon-ball around a point in k−1 dimensional space, for example. Since the space is continuous, the search process may discretize the space by taking discrete steps in each dimension, effectively creating a discrete search grid, for example. For the first air gap optimization with a starting lens system design, the processor may search for favorable initial lens gaps by placing the lenses an equal distance apart (e.g., setting d=[a, a, . . . , a], a ∈ {1, 2, . . . 6 mm}). Here, "equal" refers to a target spacing that may be substantially equal spacing. For example, values may be considered substantially equal to one another if the values are within a range of distances that will achieve an acceptable level of performance. [Generally, the lens system cannot be "too long". Accordingly, there may be an upper bound on the air gap size that may be tested during an initialization phase. Numerous air gap sizes may be tested, such as, for example, the set of values 0, 1, 2, 3, 4, 5, and 6 mm. Such values may be sufficient for initializing a system.

In some embodiments, the processor may perform a second phase of optimization by replacing $f$ with a function that measures MTF performance, after spot size optimization has converged. Specifically, the processor may first render a point spread function (PSF) via wave optics simulation using the Rayleigh-Sommerfield diffraction integral, then compute the area under the MTF curve, which may be obtained by taking the Fourier Transform of the PSF, for example.

Process 400 may proceed to block 406 where the processor may perform discrete optimization by lens splitting wherein, in some cases, one lens is replaced by two lenses. The quality of lens system designs may often be improved by adding additional (carefully selected) lenses. Commercially available SLR lenses commonly include six to ten elements (e.g., lenses and/or aperture stops). Variable zoom lenses often include 15 or so elements. Adding more lenses, however, may involve two drawbacks, where fabrication cost may increase and the design space may become combinatorially larger with each element addition. Costs may be limited by letting users specify a maximum number of elements. The processor may perform lens splitting by searching through lens catalogs and/or databases for candidate replacement lenses. Large search spaces may be handled by a number of heuristical techniques, some of which are described below.

For a particular lens system design (e.g. an intermediate design result during an optimization process, such as that described above), adding a random lens may change the overall lens system power (e.g., magnification), thus changing effective focal length and field of view, and may violate user specifications for the desired lens system design. Accordingly, the processor instead splits an existing lens into two lenses and re-optimizes (e.g., via block 404) the new lens system design. For example, distributing the power of a single lens over two replacement lenses may reduce element curvature to reduce spherical aberration. Generally, lens systems with lower mean squared refractive power tend to perform better. With careful choice of power distribution and air gap between the new replacement lenses, the overall power of the lens system may remain constant, thus yielding the same or similar FOV while improving imaging quality.

In various embodiments, the processor may use a number of one-to-two lens splitting rules to perform the process of block 406. For example, one rule dictates that, for splitting one lens into two lenses, a lens $l_1$ of power $p_0$ may be split into lens $l_1$ with power $p_1$ plus lens $l_2$ with power $p_2$. The processor may avoid relatively complex substitutions, such as replacing three lenses with one lens, or replacing three lenses with two lenses, for example, because such replacements may greatly increase the complexity of the lens system design process. Another rule dictates that splitting should only involve lenses having the same sign of power: $\text{sign}(p_0)=\text{sign}(p_1)=\text{sign}(p_2)$. In other words, for example a negative lens may only be replaced with two negative lenses.

Still another rule dictates that lens splitting should lead to approximately equal distribution of powers:

$$(1-\alpha)*|p_0|/2<|p_i|<(1+\alpha)*|p_0|/2, i\in\{1,2\}, \text{ where } 0<\alpha<1.$$

Larger $\alpha$ allows for more extreme power combinations to be considered but may lead to a prohibitively complex lens system design process.

Another rule dictates that lens splitting should preserve diameters of lenses. For example, diameters of lenses $l_1$ and $l_2$ should be within 20% of the diameter of $l_0$. This constraint avoids vignetting as the lens system gets longer and more complex.

Another lens splitting rule dictates that maximum curvature should be reduced. For example, lens $l_0$'s maximum curvature should be larger than that of lenses $l_1$ and $l_2$. This constraint helps to ensure that spherical aberrations (especially towards corners of an image field) may be expected to reduce after lens splitting.

Yet another lens splitting rule dictates that lens splitting should preferably occur where refractive power is concentrated. For example, the processor may place priority on splitting lenses with relatively large curvatures and high power.

After a lens splitting process, process 400 may proceed to diamond 408, where the processor may determine whether the lens system design is sufficiently optimized. Such a determination may be based, at least in part, on whether the lens system design meets one or more predetermined performance characteristics, for example. Such characteristics may include MTF, chromatic aberrations (e.g., toward a perimeter of a lens), and so on. If so, then process 400 advances to block 410 and the lens system design is complete. On the other hand, if the processor determines that further optimization is desirable, process 400 may return to block 404, where distances between and among the lenses and/or aperture stops may be varied. In such a fashion, lens splitting may be performed iteratively with varying the distances between and among lens system elements to improve a lens system design until its optical performance no longer increases or a maximum number of lenses (e.g., as dictated by user specifications for the lens system design) is reached. After each splitting operation, the processor may evaluate the placing of an aperture stop within each gap between lenses. For example, a lens system split into six lenses may involve five continuous optimizations, one for each possible placement of an aperture stop.

In various embodiments, the processor may bias a search for replacement lenses by prioritizing the splitting of the most powerful lenses of a lens system design. In other words, the processor may split the most powerful lens first, and then split the next most powerful lens, and so on. For example, the processor may use greedy selection criteria to rank lens elements by their maximum power and prioritize splitting according to this ranking. Splitting lenses of higher power may allow for the lens system design to attain high performing configurations, as compared to the case where less powerful lenses are split instead.

In some embodiments, a lens system design may evolve by continued lens splitting. For example, a single round of lens splitting may increase the number of lenses in the lens system by one. To obtain a k-lens design, the processor may start from a Cooke Triplet and split k-3 times consecutively. The processor may perform multiple lens splitting using a number of strategies. For example, the processor may select all replacement lenses randomly, and independently of one another, from a lens catalog or database. The processor may also perform multiple lens splitting by using the single best lens system configuration as the only starting point for lens splitting in a subsequent round. Also, after each round of splitting, the processor may keep (e.g., store in memory) the top n lens system design configurations (e.g., ranked by area under MTF curves). The group of n candidates at iteration t is $c^t$. The processor uses the next round of splitting to sample among these n candidates and apply the lens splitting process to form $c^{t+1}$. In some particular examples, n may be set to 50.

The processor may also perform multiple lens splitting by allowing the top n lens system designs to include swapped lenses before a lens split takes place. Thus, each of the k slots in a k-lens system design has n possible candidates. $c^t$ may be formed by picking one (out of n) candidate per slot at random, followed by the next round of splitting to sample among these n candidates and apply the lens splitting process to generate $c^{t+1}$.

As mentioned above, a processor may perform lens splitting by searching through lens catalogs and/or databases for candidate replacement lenses. Large search spaces may be handled by a number of heuristical techniques. For example, a number of particular conditions may be required for a candidate lens to qualify for placement in a lens system design. For example, the processor may check if the cost of a candidate lens is within a user-specified budget. The processor may also check for (present and/or future) stock or availability of the candidate lens. For a relatively fast optical test of a candidate lens placed in a lens system design, the processor may shoot a single ray near the optical axis and test to see if the ray intersects with the optical axis in an acceptable range behind the last optical surface (e.g., adjacent to the location of a sensor) of the lens system. This range may be defined by the minimum/maximum back focal length by user input, for example.

In some implementations, the processor may determine, with a candidate lens placed in the lens system design, whether the target f-number can be achieved by adjusting aperture size of the lens system design. For example, lens systems having relatively small diameters and a relatively small f-number tend to fail. The processor may also (or instead) determine whether an emitter representing the most extreme field angle of the lens system design can be imaged by a sensor of the lens system design, and that the centroid of its PSF lies relatively close to the edge of the sensor. In some examples, the processor may compare the number of rays captured at the center of the sensor to the number of rays at the corners of the sensor to see if a desired luminance fall-off is satisfactory.

Figure 5:
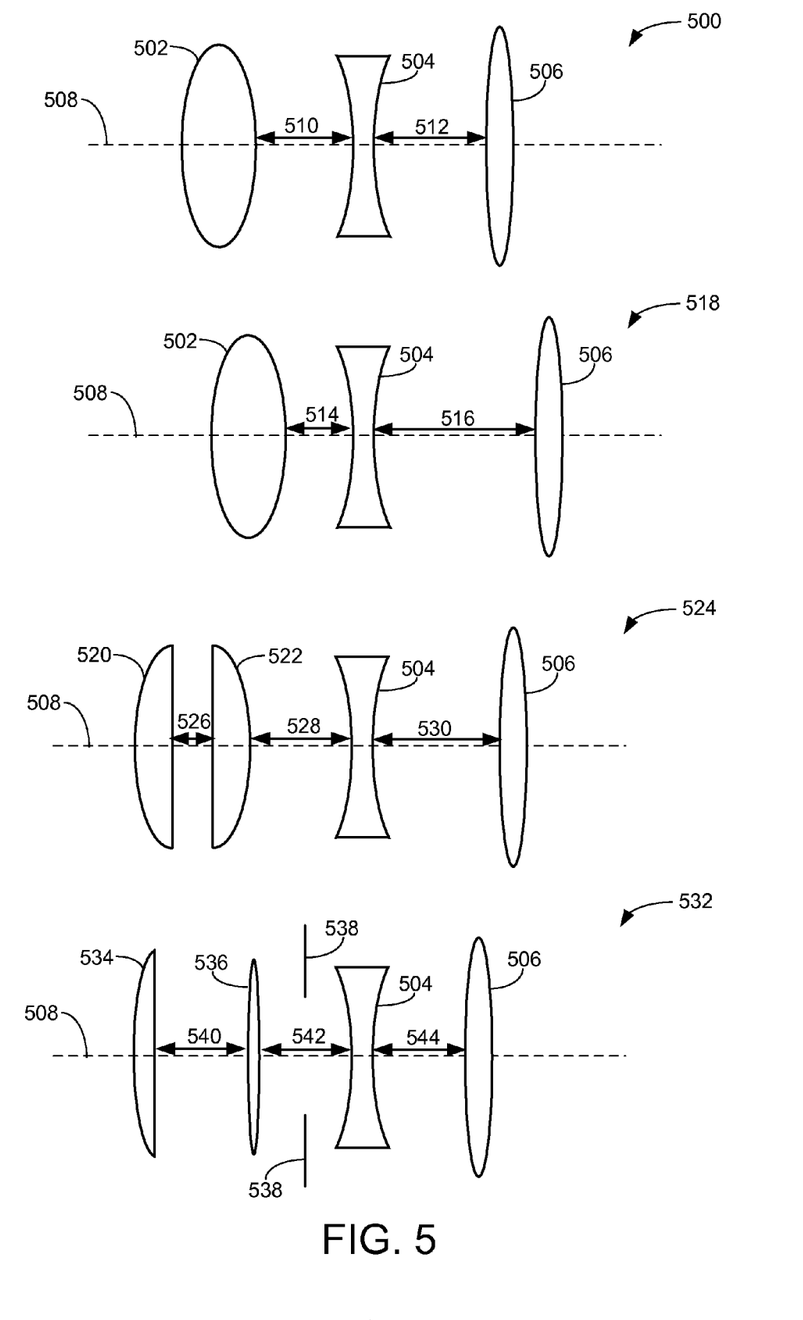
FIG. 5 illustrates a sequence of configurations for a lens system during an example design process.

FIG. 5 illustrates a sequence of configurations beginning with a lens system 500 during an example design process. For example, lens system 500 may be the same as or similar to lens system 204, illustrated in FIG. 2. Lens system 500 may be selected, for example, in process 300, such as at block 304, illustrated in FIG. 3. Lens system 500 includes a first lens 502, a second lens 504, and a third lens 506, aligned along an optical axis 508. Examples of such lens, all of which may be stock (e.g., catalog) lenses, may include biconvex, plano-convex, positive meniscus, negative meniscus, plano-concave, and biconcave, just to name a few examples. In the particular example, first and third lenses 502 and 506 are biconvex lenses and second lens 504 is a biconcave lens, though claimed subject matter is not limited to any particular type or shape of lens.

A processor, during a process of generating a lens system design, may select a lens system type, as a starting point. Lens system 500 may be such a starting point. Distance, or air gaps, between adjacent lenses may have initial values that a processor may subsequently change during a continuous optimization process. For example, distance 510 between first lens 502 and second lens 502, and distance 512 between second lens 504 and third lens 506 may be changed to distances 514 and 516, respectively. Lens system 500 having these new distances is described as lens system 518 in FIG. 5.

In some embodiments, the processor may determine that lens system 518 has reached a sufficient (or maximum) optimization by varying distances 514 and 516. In other words, the processor may determine that lens system 518 cannot be improved further by varying distances 514 and 516 by a continuous optimization process. Accordingly, the processor may perform discrete optimization by lens splitting. In particular, the processor may split the highest power lens, which is first lens 502, by replacing first lens 502 with two catalog lenses 520 and 522, thus generating lens system 524. Lens splitting from first lens 502 to lenses 520 and 522 may follow lens splitting rules or criteria described above, for example. Subsequently, the processor may proceed with a continuous optimization process that involves varying distances 526, 528, and 530 (and distances to the right or left of the lens system, which may be the distances between the lens system and a sensor or image plane, for example).

The processor may determine that lens system 524 has reached a sufficient (or maximum) optimization by varying distances 526, 528, and 530. In other words, the processor may determine that lens system 524 cannot be improved further by varying distances 526, 528, and 530 by a continuous optimization process. Accordingly, the processor may perform discrete optimization by replacing any of lenses 520, 522, 504, and 506 with a catalog replacement lens. As an example, the processor may evolve lens system 524 to lens system 532, which includes lens 520 being replaced by lens 534 and lens 522 being replaced by lens 536. In addition, and for illustrative purposes, the processor may introduce an aperture stop 538. Such lens replacements may follow rules or criteria described above, for example. Subsequently, the processor may proceed with a continuous optimization process that involves varying distances 540, 542, and 544 (and distances to the right or left of the lens system, which may be the distances between the lens system and a sensor or image plane, for example). Distances between aperture stop 538 and adjacent lenses may also be varied.

Figure 6:
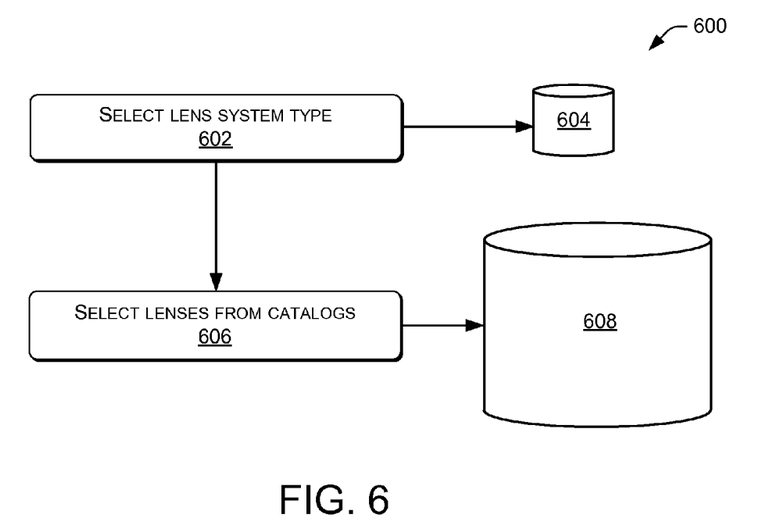
FIG. 6 is a block diagram of an example process for automatically selecting a lens system type and catalog lenses for a lens system.

FIG. 6 is a block diagram of an example process 600 for automatically selecting a lens system type and catalog lenses for a lens system. For example, such automatic processes may be similar to or the same as blocks 304 and 306 of process 300, illustrated in FIG. 3, for example.

At block 602, as part of a process for generating a lens system design, a processor may select a lens system type based, at least in part, on specifications received (e.g., such as from a user) at an earlier stage of the process. A lens system type, which may include any of a number of types of relatively broad and generic lens systems, may be stored in a catalog or database 604. For example, database 604 may store parameters of a number of Cooke triplet or Double Gauss lens systems. As described above, a lens system design process may begin with such a generic lens system type to avoid a need to perform a brute-force initial search over a relatively large number of lens candidates (such as during implementation of block 606, described below).

At block 606, the processor may replace lenses in the starting lens system type with catalog lenses from catalogs or databases 608. Database 608 may include information regarding catalog lenses maintained on the Internet, a company-based intranet, or maintained in remote storage devices or local storage devices (e.g., lens database 114), just to name a few examples. A number of vendors provide off-the shelf lenses and lens systems. For example, vendors Edmund Optics®, of Barrington, N.J., Newport®, of Irvine, Calif., Comar®, of the United Kingdom, and Thorlabs® of Newton, N.J. document their catalog lenses (e.g., in catalogs) precisely enough to be used in an optical design system. For example, specifications for about 4000 catalog lenses may be listed in websites of such vendors. Lenses include, among other things, spherical lens forms such as double-convex (DCX), double-concave (DCV), plano-convex (PCX), plano-concave (PCV), achromats (Ach-Pos and Ach-Neg), best-form, as well as meniscus lenses. About 88% of these lenses have positive power, for example. The lenses may be made from any number of materials, may include coatings (e.g., AR coatings), may be available in various sizes or diameters, and so on.

In some embodiments, a lens catalog or database that includes information such as, among other things, radii, center thicknesses, diameters, glass types, costs, and anti-reflection coating material for individual catalog lenses may be generated from website information provided by vendors. Because different vendors may provide the same or similar lenses (e.g., redundancies among the list of catalog lenses), databases or catalogs may be tailored to remove redundant lens listings. For example, a catalog of 4000 catalog lenses may include redundancies which, after removing, may reduce the size of the catalog to 770 positive lenses and 115 negative lenses, though claimed subject matter is not so limited.

Figure 7:
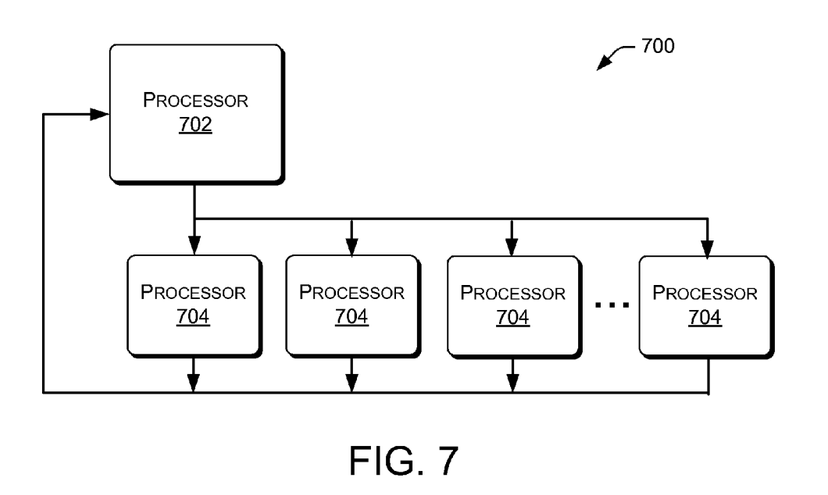
FIG. 7 is a block diagram of an example computing system configured to automatically design lens systems.

FIG. 7 is a block diagram of an example computing system 700 configured to automatically design lens systems. Computing system 700 may include a processor 702 and a number of secondary processors configured to operate asynchronously or in parallel with one another and/or with processor 702. For example, processor 702 may be the same as or similar to processor 104 illustrated in FIG. 1. Lengths of time to generate candidate lens system designs may be reduced by involving additional processors, such as 704.

Processor 702 may be configured to generate lens system designs such as by performing processes 300, 400, and/or 600, for example. Processor 702 may provide instructions and/or information regarding lenses, lens systems, and so on to any of a number of processors 704. In some implementations, processor 702 may generate a candidate lens system design while, in parallel or asynchronously with processor 702, one or more processors 704 generate other candidate lens designs. For example, a processor 704 may perform continuous and discrete optimization processes that differ from that of other processors 704. Upon or after completing lens system designs, respective processors 704 may provide their individual lens system design to processor 702, which may present the various designs to a user for final selection. In some implementations, processor 702 may also be configured to generate code for 3D printing of a housing for any or all of the candidate lens system designs.

In a particular example that helps demonstrate computational costs of generating lens system designs, consider a micro 4/3 lens system with a triplet form and having a FOV 40° (or 30 mm) at f5.6. Such a lens system may comprise two positive outer lenses and a negative middle lens. An exhaustive search of a catalog of lenses that includes 770 positive lenses and 115 negative lenses would involve 136 million combinations (considering 2 possible stop positions). If a processor (e.g., 702) considers the two possible orientations for asymmetric lens elements, the search space is actually much larger. Assuming processing each combination takes many seconds, a brute force search may take tens of thousands of CPU hours. Generally, many lens system designs require more than three elements, and a brute force approach may become infeasible. Accordingly, constraining each lens' power and diameter to be within 25% of the value of a particular base triplet design from the search space shrinks to about 12,000 combinations, which is a factor of about 11,000 times fewer possibilities, as compared to the brute force approach. Search space may be further pruned by quickly testing for constraints on the FOV and min/max BFL, which avoids expensive continuous optimization for air gaps.

For each candidate lens system design proposed by a lens splitting operation a processor(s) may proceed through a continuous optimization process to measure the lens system design performance with optimized element (e.g., lenses and/or aperture stops) spacing. For most lens systems with fewer than 7 elements, the first stage of a continuous optimization (e.g., regarding spot size or OPD) may take less than 5 minutes. Run time is approximately proportional to the number of elements. A second stage of the continuous optimization (e.g., MTF optimization) may take 1 to 2 hours. This stage may be relatively slow because PSF's are to be rendered for each field position in a single evaluation of an objective function (e.g., equation 1). In some implementations, a processor may perform MTF optimization for the most promising lens system designs from the first stage of continuous optimization. To evolve a design, a processor may allow a budget of 1,200 CPU hours for each splitting iteration. This computation may be distributed over a cluster of 600 nodes, one thread per node, for example. Such nodes may be distributed across any number of processor 704, for example.

In some embodiments, during continuous optimization processes, parameters for rays (e.g., one or more values that allow a processor to determine a ray for ray tracing in an optical system) exiting a final element of a lens system design, and which approach a sensor, may be cached. The number of rays used in a continuous optimization process may generally increase linearly with the number of surfaces in the lens system. Each extra lens element introduces at least two surfaces. Accordingly, a continuous optimization process (in particular, the inner loop of optimizing $d_k$) may be speeded up by caching all the rays that exit the last surface of the lens system design. This may be the case because when optimizing the sensor air gap, all optical surfaces in front of the sensor and their air gaps are fixed. As the sensor moves during continuous optimization, ray paths will stay unchanged except their final intersections with the sensor. For a k-element lens, there are at least 2k surfaces to trace through during a single call to the objective function (e.g., equation 1, which shoots a relatively large number of rays to compute the spot size.

Figure 8:
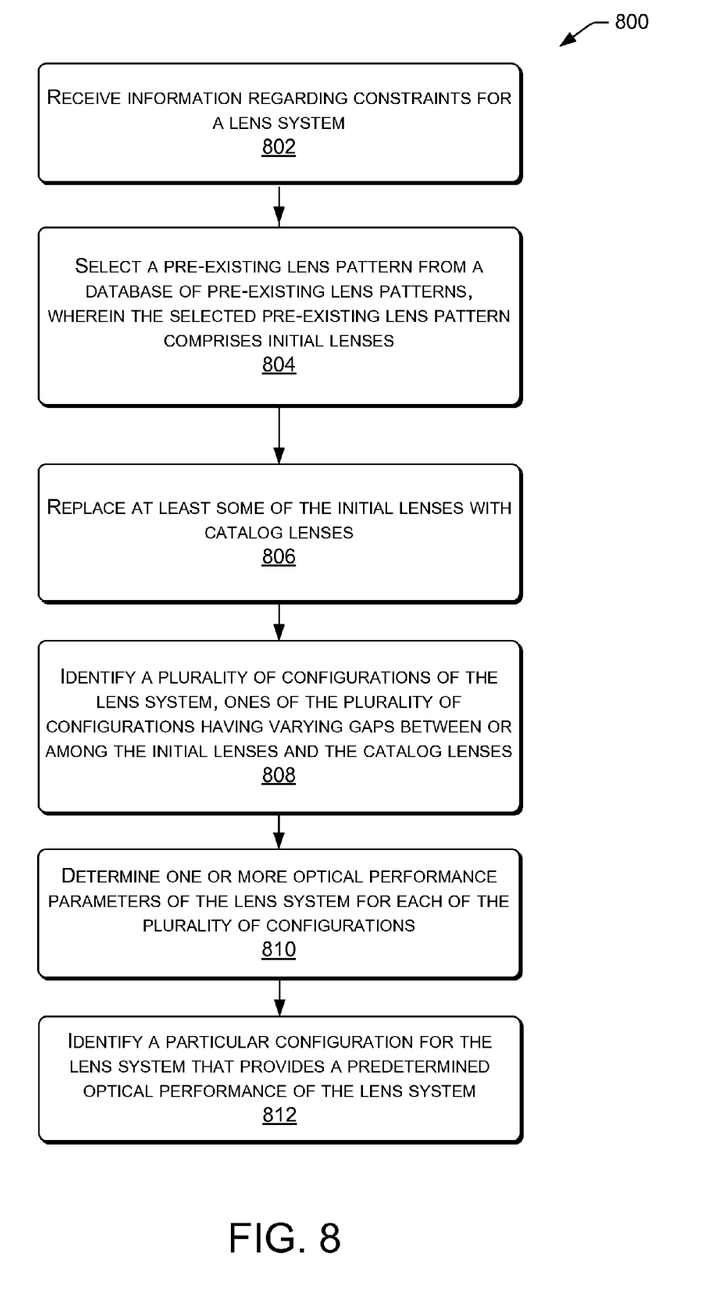
FIG. 8 is a flow diagram of an example lens design process.

FIG. 8 is a flow diagram of an example lens design process 800 that may be performed by a lens system design module or a processor (e.g., a processing unit) executing module(s). For example, process 800 may be performed by computing device 102, illustrated in FIG. 1, or more specifically, in other examples, may be performed by lens system design module 116.

At block 802, a processor may receive information regarding constraints for a lens system. At block 804, the processor may select a pre-existing lens pattern from a database of pre-existing lens patterns. The selected pre-existing lens pattern may comprise initial lenses. At block 806, the processor may replace at least some of the initial lenses with catalog lenses. At block 808, the processor may automatically identify a plurality of configurations of the lens system. Individual ones of the plurality of configurations of the lens system may have varying gaps between or among the initial lenses and the catalog lenses. At block 810, the processor may automatically determine one or more optical performance parameters of the lens system for each of the plurality of configurations. At block 812, the processor may automatically identify a particular configuration for the lens system that provides a predetermined optical performance of the lens system.

The flow of operations illustrated in FIG. 8 is illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor(s) to perform the recited operations. In the context of hardware, the blocks may represent one or more circuits (e.g., FPGAs, application specific integrated circuits—ASICs, etc.) configured to execute the recited operations.

Any routine descriptions, elements, or blocks in the flows of operations illustrated in FIG. 8 may represent modules, segments, or portions of code that include one or more executable instructions for implementing specific logical functions or elements in the routine.

In an example embodiment, a processor may generate a lens system design for a standard micro 4/3 30 mm f5.6 lens, as mentioned above. A design for such a lens may be initialized using a triplet form and evolved (e.g., via discrete and continuous optimization, such as in blocks 306 and 308 of process 300, illustrated in FIG. 3) to a 6-element lens. For example, the best (among available catalog) lenses may be realized by lens splitting a rear positive lens or lens group of the lens system design. Optimization processes may lead to placing an aperture stop directly adjacent to the negative lens group of the lens system design.

The processor may optimize the lens system design while measuring (e.g., calculating or determining) the lens system performance in terms of PSF and MTF measurements. PSF's may be rendered for the best k-element designs for $k \in \{3, 4, 5, 6\}$ at 0°, 5°, 10°, 15°, 20°. PSF's for RGB color channels may be rendered separately and centered for visualization. MTF performance for each of these four designs may be generated by averaging across the field, color channels, and orientation (tangential/sagittal), for example.

In an example embodiment, a processor may generate a lens system design that involves a curved sensor. Field curvature of a lens system made of spherical lens surfaces generally tends to be non-zero. Thus, it is natural for such lens systems to focus onto a curved surface. Imaging devices such as film cameras and telescopes may take advantage of this property in design to incorporate a curved sensor to allow for better image quality. Without a need to flatten the field curvature of a lens system, incorporating a curved sensor may reduce burdening a lens system design process, which would otherwise involve trade-offs in other aberration corrections.

As an extension of the standard micro 4/3 lens system design, a particular example may involve a spherical sensor having a radius of −24.5982 mm, diameter of 7.66 mm, and f5.6. Because of the curved sensor, the lens system design process need not struggle to fit a flat field curvature. This may allow catalog lenses to assemble into a relatively high quality lens system compared to a comparable standard lens.

In an example embodiment, a processor may generate a lens system design that involves non-parallel projection. A view camera is a type of camera with a flexible bellows that holds the lenses of the camera. This allows for relatively complex movements such as tilt, shift, swing, and so on. In a particular implementation, a lens system may be tilted relative to an image plane (sensor), so that the plane in focus is as specified and not parallel to the sensor. One example for such an application is gesture recognition and handle tracking where a user interacts with a display via gestures and hand movements near the display (the display need not be touch sensitive). The camera system, however, may only be mounted at an angle relative to the object plane (a few inches above the display) to avoid interrupting the user.

Given a user specification such as object plane size, distance and angle to the optical axis, the processor may sample a regular grid of emitter positions to cover the left half of the object plane. Performance on the other half may be the same due to symmetry. Discrete and continuous optimization processes may be performed to ensure sharpness for these emitter positions.

In an example embodiment, a processor may generate a lens system design that involves a head-mounted display (HMD) system. Virtual reality (VR) is a field where optics plays a vital role. In one particular example, the Oculus Rift®, by Oculus VR of Menlo Park, Calif., includes a plastic lens that enables a relatively large field of view by creating a virtual image of a flat panel display. Since this is a single element lens system, it exhibits significant aberrations across the field. The processor (e.g., 104) may perform a lens system design process (e.g., process 300) to design an improved two-element lens system using catalog components. A number of physical constraints may be considered. For example, the lens system cannot exceed 60 mm, there should be 10 mm clearance between the user's cornea and the last surface of the lens system, and the edges of the display should be fully visible to ensure a near 100° diagonal field of view. Such physical constraints are taken as input constraints defined by the user.

The processor may perform optimization by optimizing center sharpness from 0° to ±3° and maintaining the specified FOV but not optimizing for corner sharpness. The human visual system may be modelled as an ideal camera, and its ideal lens may be assumed to be 10 mm behind the last surface of the lens system. The design may be initialized as a single positive element. If a brute force search is carried out over all the positive elements in a stock catalog or database (e.g., 608), about forty possible lens elements may be found to satisfy the physical constraints, with varying center sharpness performance. A two-element system may evolve by lens splitting the single preliminary lens candidates, for example.

EXAMPLE CLAUSES

A. A system comprising: a memory to store lens system design specifications; and a processor to: select, based at least in part on the lens system design specifications, a lens system type that includes one or more preliminary lenses; select one or more catalog lenses to add to or replace the one or more preliminary lenses of the lens system type to generate a lens system configuration; vary distances in a plurality of iterations between the one or more catalog lenses or the one or more preliminary lenses of the lens system configuration; and determine optical behavior of the lens system for two or more of the plurality of iterations.

B. The system as paragraph A recites, wherein adding to or replacing the one or more preliminary lenses of the lens system type comprises: splitting at least one of the preliminary lenses into two individual lenses by selecting the two individual lenses from a lens database, wherein the selecting is based, at least in part, on optical and physical properties of (i) the two individual lenses and (ii) the preliminary lens being split.

C. The system as paragraph B recites, wherein the lens database comprises lens information organized by one or more of radii, center thickness, material type, cost, anti-reflection coating material, and availability.

D. The system as paragraph B recites, wherein net curvature of the two individual lenses is less than or equal to the curvature of the preliminary lens being split.

E. The system as paragraph A recites, wherein determining the optical behavior of the lens system configuration comprises: determining the modulation transfer function (MTF) and back focal length (BFL) of the lens system configuration.

F. The system as paragraph A recites, wherein selecting the one or more catalog lenses to add to or replace the one or more preliminary lenses comprises: searching in a lens database for a pair of catalog lenses that have combined optical or physical properties substantially the same as at least one of the preliminary lenses.

G. The system as paragraph A recites, wherein the processor is further configured to: select, based on the optical behavior of the lens system configuration for two or more of the plurality of iterations, particular values for the distances between the one or more catalog lenses or the one or more preliminary lenses of the lens system; and generate a lens system design based, at least in part, on the selected particular values for the distances.

H. The system as paragraph G recites, wherein the processor is further configured to: generate construction parameters of the lens system design for 3D printing of a housing for the lens system design.

I. The system as paragraph A recites, wherein the processor is further configured to: place one or more optical stops among the one or more catalog lenses.

J. The system as paragraph A recites, further comprising: one or more additional processors to construct, by parallel processing, additional lens system configurations.

K. A method comprising: receiving information regarding constraints for a lens system; selecting a pre-existing lens pattern from a database of pre-existing lens patterns, wherein the selected pre-existing lens pattern comprises initial lenses; replacing at least some of the initial lenses with catalog lenses; identifying a plurality of configurations of the lens system, ones of the plurality of configurations having varying gaps between or among the initial lenses and the catalog lenses; determining one or more optical performance parameters of the lens system for each of the plurality of configurations; and identifying a particular configuration for the lens system that provides a predetermined optical performance of the lens system.

L. The method as paragraph K recites, the method further comprising: placing an optical stop between two adjacent catalog lenses.

M. The method as paragraph K recites, wherein the constraints for the lens system include a tilt angle of an image sensor.

N. The method as paragraph K recites, wherein the constraints for the lens system include one or more of number of lens elements, materials of the lens elements, maximum number of lens elements, maximum cost of the lens elements, field of view, and f-number.

O. The method as paragraph K recites, further comprising: searching the Internet for specifications of additional catalog lenses.

P. The method as paragraph K recites, further comprising: designing multiple lens systems using parallel processing.

Q. The method as paragraph K recites, wherein the one or more optical performance parameters of the lens system comprise spot size and a modulation transfer function (MTF).

R. A computing device comprising: a memory to store lens system design specifications; and a processor to: based, at least in part, on the received lens system design specifications: select a preliminary lens system that includes initial lenses; select one or more catalog lenses to add to or replace one or more of the initial lenses of the preliminary lens system to construct an intermediate lens system configuration; vary distances in a plurality of iterations between the one or more catalog lenses or the one or more initial lenses of the preliminary lens system; and determine optical behavior of the intermediate lens system configuration for two or more of the plurality of iterations.

S. The computing device as paragraph R recites, wherein the processor is further configured to: while measuring optical behavior of the intermediate lens system configuration for a plurality of distances, cache optical rays parameters that exit a lens element that is adjacent to an optical sensor position.

T. The computing device as paragraph R recites, wherein determining the optical behavior of the intermediate lens system configuration comprises: determining the modulation transfer function (MTF) and back focal length (BFL) of the intermediate lens system configuration.

Although the techniques have been described in language specific to structural features and/or methodological acts, it is to be understood that the appended claims are not necessarily limited to the features or acts described. Rather, the features and acts are described as examples of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:

1. A system comprising:
a memory to store lens system design specifications; and
a processor to:
select, based at least in part on the lens system design specifications, a lens system type that includes one or more preliminary lenses;
select one or more catalog lenses from a catalog to add to or replace the one or more preliminary lenses of the lens system type to generate a lens system configuration;
vary distances in a plurality of iterations between the one or more catalog lenses and the one or more preliminary lenses of the lens system configuration;
determine optical behavior of the lens system for two or more of the plurality of iterations;
select, based on the optical behavior of the lens system configuration for two or more of the plurality of iterations, particular values for the distances between the one or more catalog lenses and the one or more preliminary lenses of the lens system; and
fabricate a lens housing based, at least in part, on the selected particular values for the distances.

2. The system of claim 1, wherein adding to or replacing the one or more preliminary lenses of the lens system type comprises:
splitting at least one of the preliminary lenses into two individual lenses by selecting the two individual lenses from a lens database, wherein the selecting is based, at least in part, on optical and physical properties of (i) the two individual lenses and (ii) the preliminary lens being split.

3. The system of claim 2, wherein the lens database comprises lens information organized by one or more of radii, center thickness, material type, cost, anti-reflection coating material, and availability.

4. The system of claim 2, wherein net curvature of the two individual lenses is less than or equal to the curvature of the preliminary lens being split.

5. The system of claim 1, wherein determining the optical behavior of the lens system configuration comprises:
determining the modulation transfer function (MTF) and back focal length (BFL) of the lens system configuration.

6. The system of claim 1, wherein selecting the one or more catalog lenses to add to or replace the one or more preliminary lenses comprises:
searching in a lens database for a pair of catalog lenses that have combined optical or physical properties that are substantially the same as at least one of the preliminary lenses.

7. The system of claim 1, wherein the processor is further configured to:

place one or more optical stops among the one or more catalog lenses.

8. The system of claim 1, further comprising:
one or more additional processors to construct, by parallel processing, additional lens system configurations.

9. A method comprising:
receiving information regarding constraints for a lens system;
selecting a pre-existing lens pattern from a database of pre-existing lens patterns, wherein the selected pre-existing lens pattern comprises initial lenses;
replacing at least some of the initial lenses with catalog lenses from a catalog;
identifying a plurality of configurations of the lens system, ones of the plurality of configurations having varying gaps between or among the initial lenses and the catalog lenses;
determining one or more optical performance parameters of the lens system for each of the plurality of configurations;
identifying a particular configuration for the lens system that provides a predetermined optical performance of the lens system; and
fabricating a lens housing having the particular configuration for the lens system.

10. The method of claim 9, the method further comprising:
placing an optical stop between two adjacent catalog lenses.

11. The method of claim 9, wherein the constraints for the lens system include a tilt angle of an image sensor.

12. The method of claim 9, wherein the constraints for the lens system include one or more of number of lens elements, materials of the lens elements, maximum number of lens elements, maximum cost of the lens elements, field of view, and f-number.

13. The method of claim 9, further comprising:
searching the Internet for specifications of additional catalog lenses.

14. The method of claim 9, further comprising:
designing multiple lens systems using parallel processing.

15. The method of claim 9, wherein the one or more optical performance parameters of the lens system comprise spot size and a modulation transfer function (MTF).

16. A computing device comprising:
a memory to store lens system design specifications; and
a processor to:
based, at least in part, on the received lens system design specifications:
select a preliminary lens system that includes initial lenses;
select one or more catalog lenses from a catalog to add to or replace one or more of the initial lenses of the preliminary lens system to constrict an intermediate lens system configuration;
vary distances in a plurality of iterations between the one or more catalog lenses and the one or more initial lenses of the preliminary lens system;
determine optical behavior of the intermediate lens system configuration for two or more of the plurality of iterations;
select, based on the optical behavior of the lens system configuration for two or more of the plurality of iterations, particular values for the distances between the one or more catalog lenses and the one or more preliminary lenses of the lens system; and
fabricate a lens housing based, at least in part, on the selected particular values for the distances.

17. The computing device of claim 16, wherein the processor is further configured to:
while measuring optical behavior of the intermediate lens system configuration for a plurality of distances, cache optical rays parameters that exit a lens element that is adjacent to an optical sensor position.

18. The computing device of claim 16, wherein determining the optical behavior of the intermediate lens system configuration comprises:
determining the modulation transfer function (MTF) and back focal length (BFL) of the intermediate lens system configuration.

* * * * *